(12) United States Patent
Shimada et al.

(10) Patent No.: US 7,978,586 B2
(45) Date of Patent: Jul. 12, 2011

(54) OPTICAL PICKUP DEVICE

(75) Inventors: Naoto Shimada, Hyogo (JP); Hiroaki Yamamoto, Hyogo (JP); Naoki Nakanishi, Shiga (JP); Masahiko Nishimoto, Osaka (JP); Takuya Okuda, Kyoto (JP)

(73) Assignee: Panasonic Corporation, Osaka (JP)

( * ) Notice: Subject to any disclaimer, the term of this patent is extended or adjusted under 35 U.S.C. 154(b) by 670 days.

(21) Appl. No.: 12/090,385

(22) PCT Filed: Jul. 18, 2007

(86) PCT No.: PCT/JP2007/064143
§ 371 (c)(1),
(2), (4) Date: Apr. 16, 2008

(87) PCT Pub. No.: WO2008/075478
PCT Pub. Date: Jun. 26, 2008

(65) Prior Publication Data
US 2010/0177618 A1    Jul. 15, 2010

(30) Foreign Application Priority Data
Dec. 18, 2006 (JP) .................. 2006-339532

(51) Int. Cl.
*G11B 7/00* (2006.01)
(52) U.S. Cl. ......... 369/112.07; 369/112.03; 369/112.04; 369/112.12
(58) Field of Classification Search .............. None
See application file for complete search history.

(56) References Cited

U.S. PATENT DOCUMENTS

| 2004/0081064 A1 | 4/2004 | Ohnishi et al. |
| 2005/0276206 A1 | 12/2005 | Katayama |
| 2008/0253263 A1* | 10/2008 | Komma ............... 369/112.05 |

FOREIGN PATENT DOCUMENTS

| JP | 61-094246 | 5/1986 |
| JP | 4-34212 | 6/1992 |
| JP | 2004-145915 | 5/2004 |
| JP | 2005-353187 | 12/2005 |
| JP | 2006-228304 | 8/2006 |
| JP | 2007-35193 | 2/2007 |
| JP | 2007-42252 | 2/2007 |
| JP | 2007-122779 | 5/2007 |
| JP | 2007-141425 | 6/2007 |

* cited by examiner

*Primary Examiner* — Joseph H Feild
*Assistant Examiner* — Ifedayo Iluyomade
(74) *Attorney, Agent, or Firm* — McDermott Will & Emery LLP

(57) ABSTRACT

An optical pickup device includes a diffraction grating 12 for separating a light beam emitted from a semiconductor laser element into at least three light beams. The diffraction grating 12 is divided into three regions by a straight line extending in a direction parallel to a tangent line of a track of an optical information recording medium. A second region 12B is divided into a first sub-block 13 and a second sub-block 14 by a straight line extending in a direction parallel to a radius direction of the optical information recording medium. The first sub-block 13 has a phase difference of approximately 180 degrees from the second sub-block 14. The first region 12A has a phase difference of approximately 90 degrees from the first sub-block 13 and has a phase difference of approximately 180 degrees from the third region 12C.

17 Claims, 12 Drawing Sheets

US 7,978,586 B2

OPTICAL PICKUP DEVICE

RELATED APPLICATIONS

This application is the U.S. National Phase under 35 U.S.C. §371 of International Application No. PCT/JP2007/064143, filed on Jul. 18, 2007, which in turn claims the benefit of Japanese Patent Application No. JP 2006-339532, filed on Dec. 18, 2006, the disclosures of which Applications are incorporated by reference herein.

TECHNICAL FIELD

The invention relates to an optical pickup device that is used in an optical information processor for performing processing such as recording of information onto an optical information recording medium and playback or erasure of information recorded on the optical information recording medium.

BACKGROUND ART

Reading recorded information from an optical information recording medium (optical disc) such as a CD (Compact Disc) and a DVD (Digital Versatile Disc) is conducted by converging a light beam emitted from a light source such as a semiconductor laser device on a recording track of the optical disc by using an objective lens and converting reflected light from the optical disc to an electric signal by a photodetector. In order to accurately converge a light beam on a desired recording track of a rapidly spinning optical disc, a focus error signal and a tracking error signal are detected and the position of the objective lens is controlled according to surface displacement, eccentricity, and the like of the optical disc.

A differential push-pull (DPP) method is known as a typical method for detecting a tracking error signal. In the DPP method, a light beam is separated into three beams: a main beam; a $+1^{st}$ order diffracted beam; and a $-1^{st}$ order diffracted beam. These three beams are respectively converged on three adjacent guide grooves formed at a prescribed pitch on the optical disc. Push-pull signals respectively obtained by detecting reflected light of the $+1^{st}$ order diffracted beam and the $-1^{st}$ order diffracted beam and performing an arithmetic operation have a phase difference of 180 degrees from a push-pull signal obtained by detecting reflected light of the main beam and performing an arithmetic operation. Therefore, by performing arithmetic processing of each push-pull signal, only offset components included in the push-pull signals are selectively cancelled each other, whereby an excellent tracking error signal can be detected. Accordingly, the DDP method has been widely used especially in a DVD recording optical pickup (e.g., see Patent document 1).

There are various standards for currently used optical discs, and a guide groove pitch varies depending on the standards of the optical discs. For example, optical discs such as a write once type DVD-R (Recordable) and an erasable type DVD-RW (Disk ReWritable) have a guide groove pitch of 0.74 μm, and optical discs such as an erasable type DVD-RAM (Random Access Memory) has a guide groove pitch of 1.23 μm. An optical pickup device that enables recording and playback on two or more types of optical discs of different standards has been demanded. The following optical pickup device is proposed in view of this demand (e.g., see Patent document 2).

In the optical pickup device disclosed in Patent document 2, a special diffraction grating for separating a light beam is divided into three regions, and the phase of grating grooves periodically provided in each region is sequentially shifted by 90 degrees. A tracking error detection method using such a special diffraction grating is called an in-line DPP method, and the in-line DPP method enables stable tracking error detection on a plurality of optical information recording media having different guide groove pitches.

Patent document 1: Japanese Patent Publication for Opposition No. 4-34212
Patent document 2: Japanese Laid-Open Patent Publication No. 2004-145915

DISCLOSURE OF THE INVENTION

Problems to be Solved by the Invention

However, a conventional optical pickup device using the conventional in-line DPP method has the following problems.

FIG. 11 shows convergence spots of light beams that are converged on an optical information recording medium by a conventional optical pickup device. A convergence spot 101 corresponding to a $+1^{st}$ order diffracted beam has higher intensity on the right side in a radial direction X of the optical information recording medium and has lower intensity on the left side. On the other hand, a convergence spot 102 corresponding to a $-1^{st}$ order diffracted beam has lower intensity on the right side and has higher intensity on the left side. This can be explained as follows:

As shown in FIG. 12, in a special diffraction grating used in the conventional in-line DPP method, the phase of grating grooves 119a in a region 119 is ahead of that of grating grooves 120a in a central region 120 by 90 degrees, and the phase of grating grooves 121a in a region 121 is behind that of the grating grooves 120a in the central $+1^{st}$ order diffracted beam that has passed through the region 119 is ahead of that of the $+1^{st}$ order diffracted beam that has passed through the central region 120 by 90 degrees, and the phase of the $+1^{st}$ order diffracted beam that has passed through the region 121 is behind that of the $+1^{st}$ order diffracted beam that has passed through the central region 120 by 90 degrees. The phase relation of the grating grooves and diffracted beams is opposite for the $-1^{st}$ order diffracted beam. In other words, the phase of the $-1^{st}$ order diffracted beam that has passed through the region 119 is behind that of the $-1^{st}$ order diffracted beam that has passed through the central region 120 by 90 degrees, and the phase of the $-1^{st}$ order diffracted beam that has passed through the region 121 is ahead of that of the $-1^{st}$ order diffracted beam that has passed through the central region 120 by 90 degrees.

Accordingly, the $+1^{st}$ order diffracted beam has larger intensity distribution on the side of the region 121 where the phase is retarded, and the convergence spot 101 corresponding to the $+1^{st}$ order diffracted beam on the optical information recording medium has higher intensity on the right side and lower intensity on the left side. On the other hand, the $-1^{st}$ order diffracted beam has larger intensity distribution on the side of the region 119 where the phase is retarded, and the convergence spot 102 corresponding to the $-1^{st}$ order diffracted beam has lower light intensity on the right side and higher intensity on the left side.

In the case where the convergence spot 101 corresponding to the $+1^{st}$ order diffracted beam and the convergence spot 102 corresponding to the $-1^{st}$ order diffracted beam have left-right asymmetric intensity distribution, the phase difference between a push-pull signal obtained by detecting reflected light from the convergence spot 100 corresponding to the main beam and each of push-pull signals respectively obtained by detecting reflected light from the convergence spots 101 and 102 is shifted from 180 degrees. Therefore, each convergence spot cannot be formed on the same guide groove, and stable tracking error signal detection by the in-line DPP method cannot be implemented.

The invention is made to solve the above problems and it is an object of the invention to implement an optical pickup device for conducting stable tracking error detection on a plurality of optical information recording media having different guide groove pitches while maintaining the advantages of the in-line DPP method.

Means for Solving the Problems

In order to achieve the above object, an optical pickup device of the invention includes a diffraction grating that is divided into three regions having different phases, and the region located in the middle is divided into a plurality of sub-blocks having different phases.

More specifically, a first optical pickup device according to the invention is an optical pickup device for recording information onto an optical information recording medium and reading and erasing information recorded on the optical information recording medium, and includes: a light source; a diffraction grating for separating a light beam emitted from the light source into at least three light beams; and a photodetector for receiving the separated light beams reflected from the optical information recording medium. The diffraction grating is divided into a first region, a second region, and a third region having periodic structures with different phases by a dividing line of a first direction that is a straight line extending in a direction parallel to a tangential direction of a track of the optical information recording medium. The second region is located between the first region and the third region and is divided into a first sub-block and a second sub-block having the periodic structures with different phases by a dividing line of a second direction that is a straight line extending in a direction parallel to a radius direction of the optical information recording medium. The periodic structure of the first sub-block has a phase difference of approximately 180 degrees from the periodic structure of the second sub-block. The periodic structure of the first region has a phase difference of approximately 90 degrees from the periodic structure of the first sub-block. The periodic structure of the first region has a phase difference of approximately 180 degrees from the periodic structure of the third region.

In the first optical pickup device, the periodic structure of the first sub-block has a phase difference of approximately 180 degrees from the periodic structure of the second sub-block, the periodic structure of the first region has a phase difference of approximately 90 degrees from the periodic structure of the first sub-block, and the periodic structure of the first region has a phase difference of approximately 180 degrees from the periodic structure of the third region. Therefore, a phase of a $+1^{st}$ order diffracted beam that has passed through the first region is ahead of that of the $+1^{st}$ order diffracted beam that has passed through the first sub-block, and is behind that of the $+1^{st}$ order diffracted beam that has passed through the second sub-block. The phase of the $+1^{st}$ order diffracted beam that has passed through the third region is ahead of that of the $+1^{st}$ order diffracted beam that has passed through the second sub-block, and is behind that of the $+1^{st}$ order diffracted beam that has passed through the first sub-block. An opposite phenomenon occurs for a $-1^{st}$ order diffracted beam. Accordingly, unlike the conventional in-line DPP method, the spot shape does not become left-right asymmetric, and intensity distribution becomes left-right symmetric with respect to an extending direction of guide grooves. As a result, an optical pickup device for performing stable tracking error detection on a plurality of optical information recording media having different guide groove pitches can be implemented.

In the first optical pickup device, a center of the light beam emitted from the light source may be positioned on the dividing line of the second direction in the second region of the diffraction grating.

In the first optical pickup device, the light source may include a plurality of light sources, and a center of a light beam emitted from at least one of the plurality of light sources may be positioned on the dividing line of the second direction in the second region of the diffraction grating.

In the first optical pickup device, the light source may include a first light source and a second light source. A center of a light beam emitted from the first light source may be positioned in the first region of the diffraction grating or on the dividing line of the first direction that separates the first region and the second region from each other. A center of a light beam emitted from the second light source may be positioned in the third region of the diffraction grating or on the dividing line of the first direction that separates the second region and the third region from each other. A straight line connecting the center of the light beam emitted from the first light source and the center of the light beam emitted from the second light beam may cross the dividing line of the second direction.

In the first optical pickup device, it is preferable that a length of the first sub-block in the tangential direction is equal to a length of the second sub-block in the tangential direction. With this structure, left-right symmetry of convergence spots of sub-beams can be reliably improved.

In the first optical pickup device, the at least three light beams may include a $0^{th}$ order diffracted beam, a $+1^{st}$ order diffracted beam, and a order diffracted beam.

In the first optical pickup device, a plurality of guide grooves may be periodically formed on a recording surface of the optical information recording medium, and each of the separated light beams may be converged on one of the plurality of guide grooves.

The first optical pickup device may further include an arithmetic processing circuit for detecting a tracking error signal by a differential push-pull method based on an output signal of the photodetector.

In the first optical pickup device, the photodetector may include at least three light receiving elements respectively corresponding to the reflected light beams, and each of the light receiving elements may be divided into a plurality of light receiving regions.

A second optical pickup device according to the invention is an optical pickup device for recording information onto an optical information recording medium and reading and erasing information recorded on the optical information recording medium, and includes: a light source; a diffraction grating for separating a light beam emitted from the light source into at least three light beams; an objective lens for converging the separated light beams on a recording surface of the optical information recording medium as independent convergence spots; and a photodetector for receiving the light beams converged as the convergence spots and reflected from the optical information recording medium. The diffraction grating is divided into a first region, a second region, and a third region having periodic structures with different phases by a dividing line of a first direction that is a straight line extending in a direction parallel to a tangential direction of a track of the optical information recording medium. The second region is located between the first region and the third region and is divided into a first sub-block and a second sub-block having the periodic structures with different phases by a dividing line of a second direction that is a straight line extending in a direction parallel to a radius direction of the optical information recording medium. The first sub-block and the second sub-block are alternately arranged in the second region in a direction parallel to the tangential direction of the track of the optical information recording medium. The periodic structure of the first sub-block has a phase difference of approximately 180 degrees from the periodic structure of the second sub-block. The periodic structure of the first region has a phase difference of approximately 90 degrees from the periodic structure of the first sub-block. The periodic structure of the first region has a phase difference of approximately 180 degrees from the periodic structure of the third region.

In the second optical pickup device, the first sub-block and the second sub-block are alternately arranged in the second region in the direction parallel to the tangential direction of the track of the optical information recording medium, and the periodic structure of the first sub-block has a phase difference of approximately 180 degrees from the periodic structure of the second sub-block. Therefore, the difference between the total area of the light beam passing through the first sub-blocks and the total area of the light beam passing through the second sub-blocks, that is, the difference between the total light quantity of the light beam passing through the first sub-blocks and the total light quantity of the light beam passing through the second sub-blocks, can be suppressed. As a result, excellent properties can be obtained regardless of the position of the diffraction grating in Y direction, that is, the position of a center of the light beam emitted from the light source.

In the second optical pickup device, a center of the light beam emitted from the light source may be positioned in the second region of the diffraction grating.

In the second optical pickup device, the light source may include a plurality of light sources, and a center of a light beam emitted from at least one of the plurality of light sources may be positioned in the second region of the diffraction grating.

In the second optical pickup device, the light source may include a first light source and a second light source. A center of a light beam emitted from the first light source may be positioned in the first region of the diffraction grating or on the dividing line of the first direction that separates the first region and the second region from each other. A center of a light beam emitted from the second light source may be positioned in the third region of the diffraction grating or on the dividing line of the first direction that separates the second region and the third region from each other.

In the second optical pickup device, the at least three light beams may include a $0^{th}$ order diffracted beam, a $+1^{st}$ order diffracted beam, and a $-1^{st}$ order diffracted beam.

In the second optical pickup device, a plurality of guide grooves may be periodically formed on a recording surface of the optical information recording medium, and each of the separated light beams may be converged on one of the plurality of guide grooves.

The second optical pickup device may further include an arithmetic processing circuit for detecting a tracking error signal by a differential push-pull method based on an output signal of the photodetector.

In the second optical pickup device, the photodetector may include at least three light receiving elements respectively corresponding to the reflected light beams, and each of the light receiving elements may be divided into a plurality of light receiving regions.

Effects of the Invention

The invention can thus implement an optical pickup device for conducting stable tracking error detection on a plurality of optical information recording media having different guide groove pitches while maintaining the advantages of the in-line DPP method.

Figure 1:
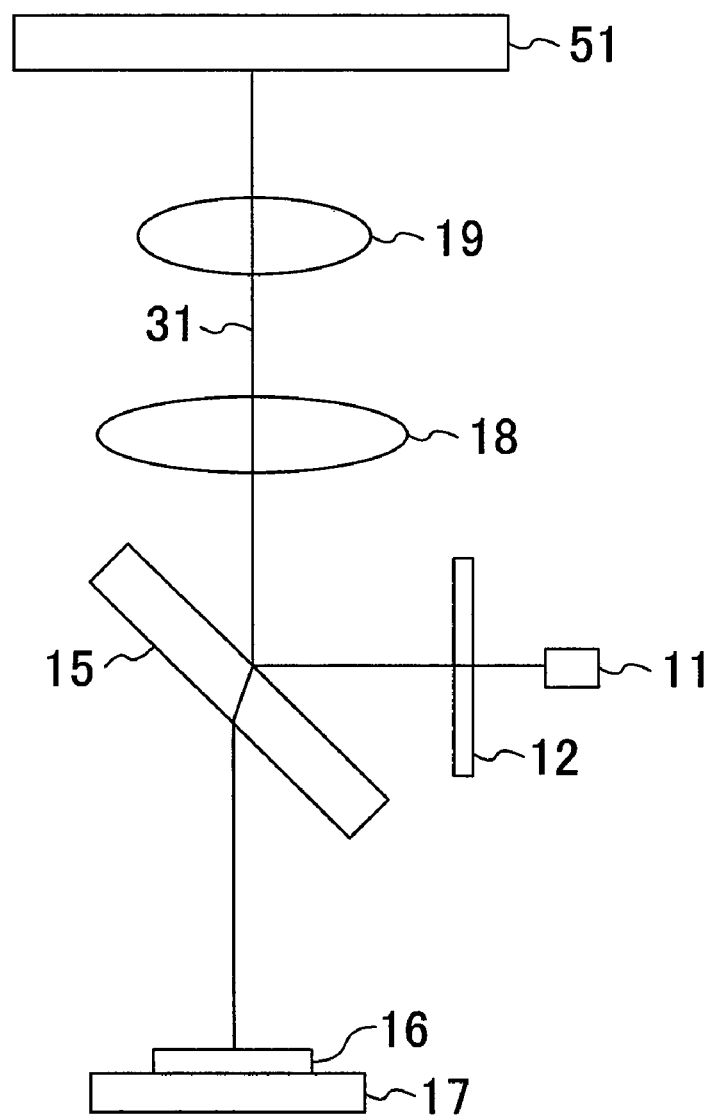
FIG. 1 is a block diagram of an optical pickup device according to a first embodiment of the invention.

| DESCRIPTION OF THE REFERENCE NUMERALS | |
|---|---|
| 11 | light source |
| 12 | diffraction grating |
| 12A | first region |
| 12B | second region |
| 12C | third region |
| 12a | grating groove |
| 13 | first sub-block |
| 14 | second sub-block |
| 15 | half mirror |

-continued

DESCRIPTION OF THE REFERENCE NUMERALS

| | |
|---|---|
| 16 | photodetector |
| 17 | integrated circuit board |
| 18 | collimating lens |
| 19 | objective lens |
| 21A | light receiving element |
| 21B | light receiving element |
| 21C | light receiving element |
| 23 | arithmetic processing circuit |
| 24 | subtracter |
| 25 | subtracter |
| 26 | subtracter |
| 27 | adder |
| 28 | amplifier |
| 29 | subtracter |
| 31 | emitted light beam |
| 31a | main beam |
| 31b | sub-beam |
| 31c | sub-beam |
| 51 | optical information recording medium |
| 51a | guide groove |

BEST MODE FOR CARRYING OUT THE INVENTION

First Embodiment

A first embodiment of the invention will be described with reference to the accompanying drawings. FIG. 1 schematically shows a structure of an optical pickup device according to the first embodiment.

As shown in FIG. 1, the optical pickup device of the first embodiment includes a light source 11, such as a semiconductor laser element, for emitting a light beam 31, a diffraction grating 12 for diffracting and separating the emitted light beam 31 into at least three light beams (not shown): a main beam that is a $0^{th}$ order diffracted beam; a sub-beam that is a $+1^{st}$ order diffracted beam; and a sub-beam that is a $-1^{st}$ order diffracted beam, a half mirror 15 for guiding the separated light beams to an optical information recording medium 51, and an integrated circuit board 17 having a photodetector 16 for receiving the separated light beams reflected from the optical information recording medium 51. Recording of information to the optical information recording medium 51 and reading of information recorded on the optical information recording medium 51 are conducted with this structure.

A collimating lens 18 and an objective lens 19 are placed between the half mirror 15 and the optical information recording medium 51. The light beam 31 emitted from the light source 11 is first diffracted and separated into at least three light beams: a $0^{th}$ order diffracted beam; a $+1^{st}$ order diffracted beam; and a $-1^{st}$ order diffracted beam by the diffraction grating 12. The diffracted beams thus separated are then reflected by the half mirror 15 and reach the objective lens 19 through the collimating lens 18. The $0^{th}$ order diffracted beam, the $+1^{st}$ order diffracted beam, and the $-1^{st}$ order diffracted beam thus obtained by the diffraction grating 1 are then independently converged on a recording surface of the optical information recording medium 51 by the objective lens 19 to form three convergence spots.

Figure 2:
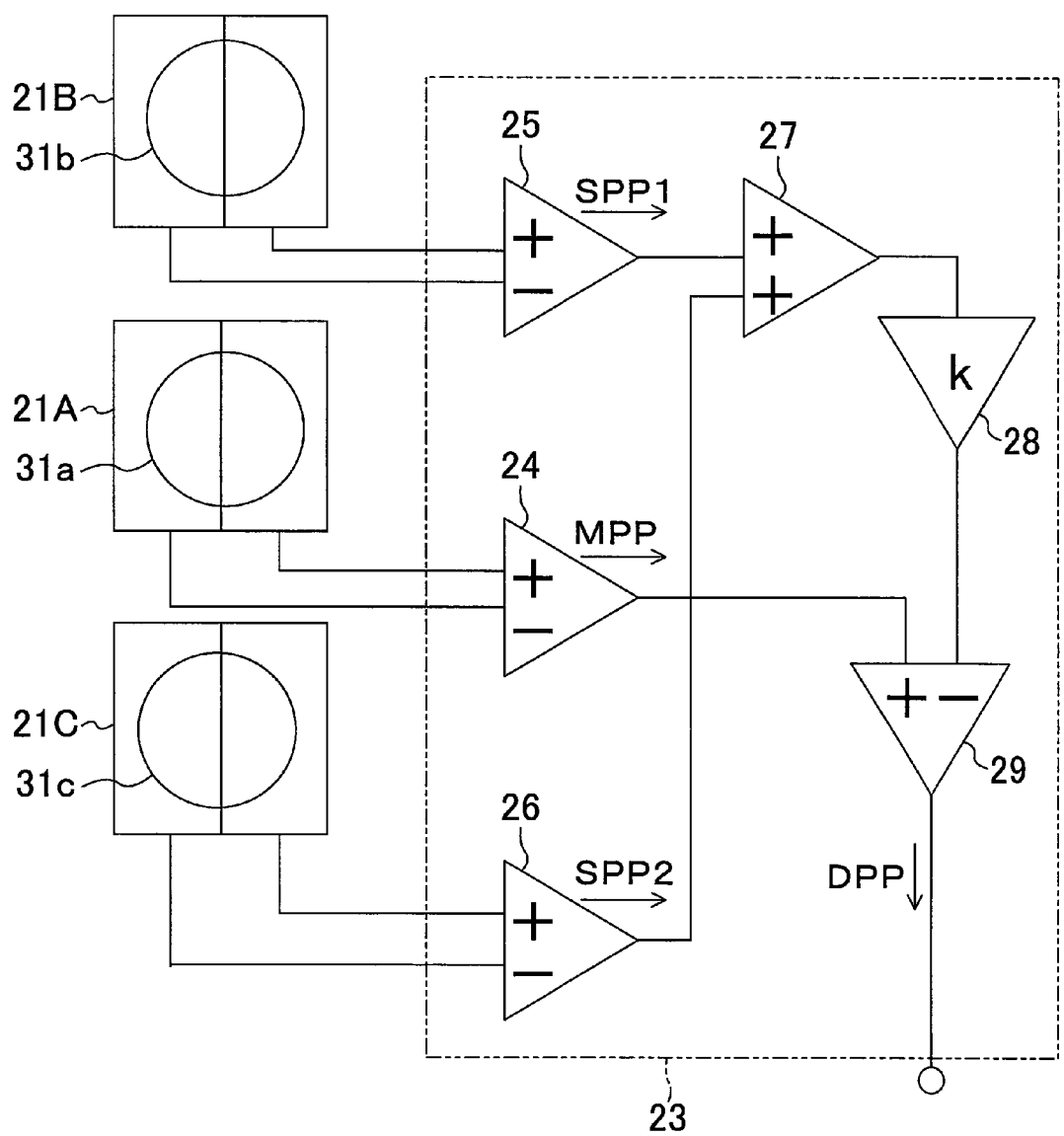
FIG. 2 is a circuit diagram of a photodetector of the optical pickup device according to the first embodiment of the invention.

FIG. 2 shows a circuit structure of the integrated circuit board 17 having the photodetector 16 in the optical pickup device of FIG. 1. As shown in FIG. 2, the integrated circuit board 17 has light receiving elements 21A, 21B, and 21C and an arithmetic processing circuit 23 for performing an arithmetic operation of signals from the light receiving elements. A main beam 31a and two sub-beams 31b and 31c separated from the emitted light beam 31 by the diffraction grating 12 are received by the light receiving elements 21A, 21B, and 21C, respectively. Each of the light receiving elements 21A, 21B, and 21C is divided into a plurality of light receiving regions.

Signals detected by the light receiving elements 21A, 21B, and 21C are applied to the arithmetic processing circuit 23. The arithmetic processing circuit 23 has subtracters 24, 25, and 26 for receiving signals from the light receiving elements 21A, 21B, and 21C, respectively, and an adder 27, an amplifier 28, and a subtracter 29 for receiving signals from the subtracters 24, 25, and 26. The subtracters 24, 25, and 26 receive signals from the light receiving elements 21A, 21B, and 21C and output push-pull signals MPP, SPP1, and SPP2, respectively. The adder 27, the amplifier 28, and the subtracter 29 of the arithmetic processing circuit 23 will be described later.

In the circuit structure of FIG. 2, each light receiving element is divided into two light receiving regions. However, each light receiving element may be divided into three or more light receiving regions. In FIG. 2, each beam in each light receiving element is schematically shown to have a circular shape. However, the beam shape is not limited to this.

Figure 3:
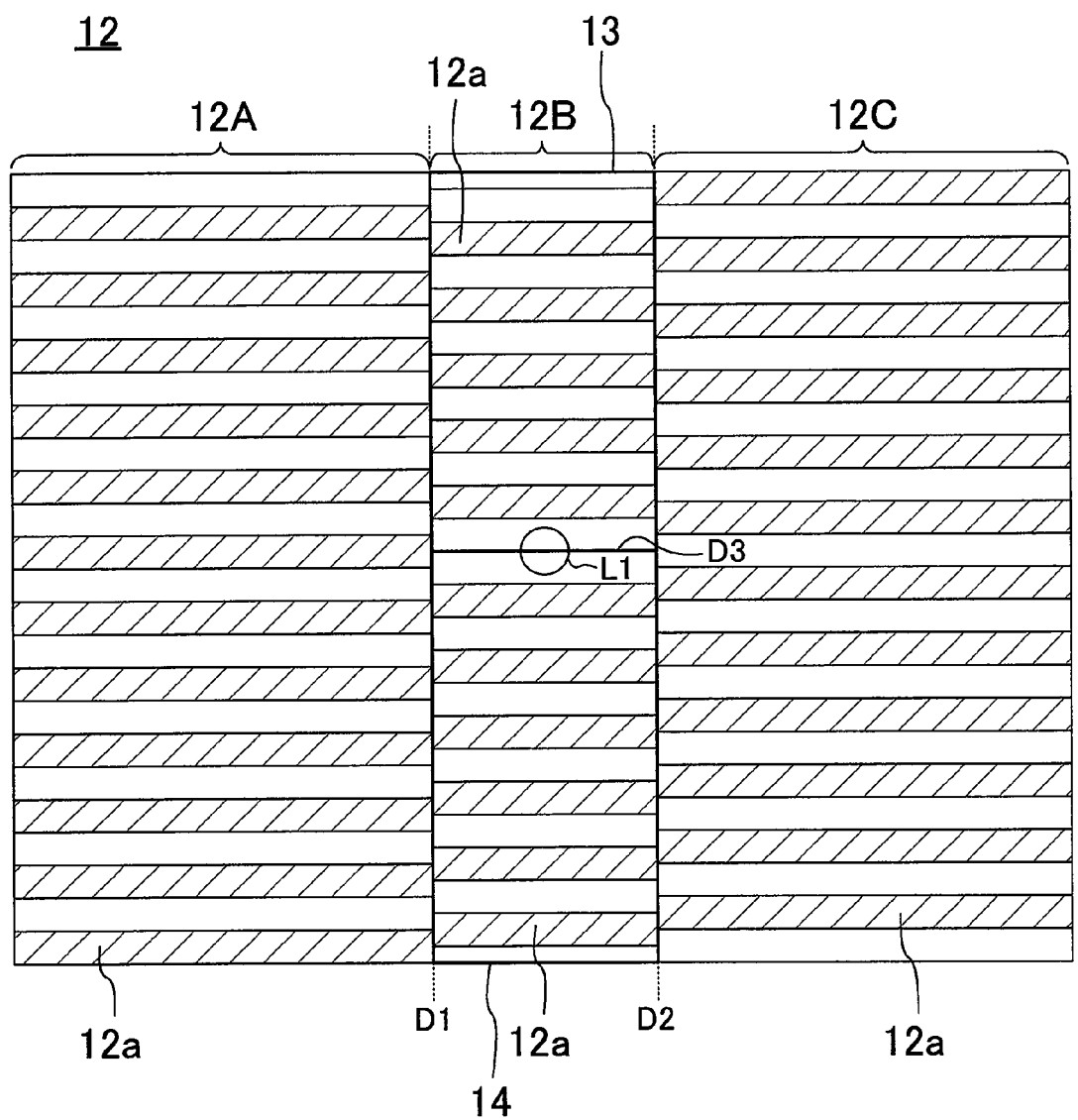
FIG. 3 is a plan view of a diffraction grating of the optical pickup device according to the first embodiment of the invention.

The optical pickup device of this embodiment is characterized in the diffraction grating 12 for diffracting the emitted light beam 31 and is characterized especially in a periodic structure of the diffraction grating 12. FIG. 3 shows a periodic structure, that is, a grating pattern, of the diffraction grating 12.

As shown in FIG. 3, a grating surface of the diffraction grating 12 is divided into three regions: a first region 12A; a second region 12B; and a third region 12C, by two dividing lines D1 and D2 extending in an extending direction of guide grooves of the optical information recording medium 51 (hereinafter, referred to as Y direction), that is, in a direction substantially parallel to a tangential direction of a track of the optical information recording medium 51. In other words, the first region 12A and the second region 12B are adjacent to each other with the dividing line D1 interposed therebetween, and the second region 12B and the third region 12C are adjacent to each other with the dividing line D2 interposed therebetween.

The second region 12B is divided into a first sub-block 13 and a second sub-block 14 by a dividing line D3 extending in a direction substantially parallel to a radius direction (hereinafter, referred to as X direction) of the optical information recording medium 51. It is preferable that the first sub-block 13 and the second sub-block 14 have the same length in Y direction.

In this case, the parallel direction means a parallel direction in view of an optical system provided between the diffraction grating and the optical information recording medium.

As shown in FIG. 3, grating grooves 12a are periodically provided along X direction in the first region 12A, the second region 12B, and the third region 12C. The phase of the periodic structure of the grating grooves 12a is different among the first region 12A, the second region 12B, and the third region 12C, and is also different between the first sub-block 13 and the second sub-block 14.

More specifically, the phase of the periodic structure formed by the grating grooves 12a in the first region 12A is ahead of that of the periodic structure in the first sub-block 13 of the second region 12B by substantially 90 degrees (shifted by substantially +90 degrees). In other words, the arrangement of the grating grooves 12a in the first region 12A is shifted by one fourth of a pitch of the grating grooves 12a in +Y direction from the arrangement of the grating grooves 12a in the first sub-block 13. Moreover, the phase of the periodic structure in the third region 12C is behind that of the periodic structure in the first sub-block 13 by substantially 90 degrees (shifted by substantially −90 degrees). In other words, the arrangement of the grating grooves 12a in the third region 12C is shifted by one fourth of the pitch of the grating grooves 12a in −Y direction from the arrangement of the grating grooves 12a in the first sub-block 13. Accordingly, the periodic structure in the first region 12A has a phase difference of substantially 180 degrees from the periodic structure in the third region 12C. Moreover, the phase of the periodic structure in the second sub-block 14 is shifted by substantially 180 degrees from that of the periodic structure in the first sub-block 13. In other words, the arrangement of the grating grooves 12a in the second sub-block 14 is shifted by one half of the pitch of the grating grooves 12a in +Y direction from the arrangement of the grating grooves 12a in the first sub-block 13.

The phase of the periodic structure in each region does not have to be shifted exactly by 90 degrees or 180 degrees. Since the convergence spots on the recording surface of the optical information recording medium 51 need only have such a shape as described below, the phase shift may include an error of about ±10 degrees.

As shown in FIG. 3, the center (the center of a light emitting point) L1 of the light beam 31 emitted from the light source 11 is preferably positioned on the dividing line D3 within the range of assembly accuracy of the device.

The emitted light beam 31 incident on the diffraction grating 12 is separated into a main beam and sub-beams having a prescribed phase difference by the respective periodic structures formed in the first region 12A, the second region 12B, and the third region 12C, and the separated sub-beams are then guided to the optical information recording medium 51.

Hereinafter, the reason why the optical pickup device of the first embodiment is able to stably detect tracking errors on optical information recording media having different guide groove pitches will be described.

Figure 4:
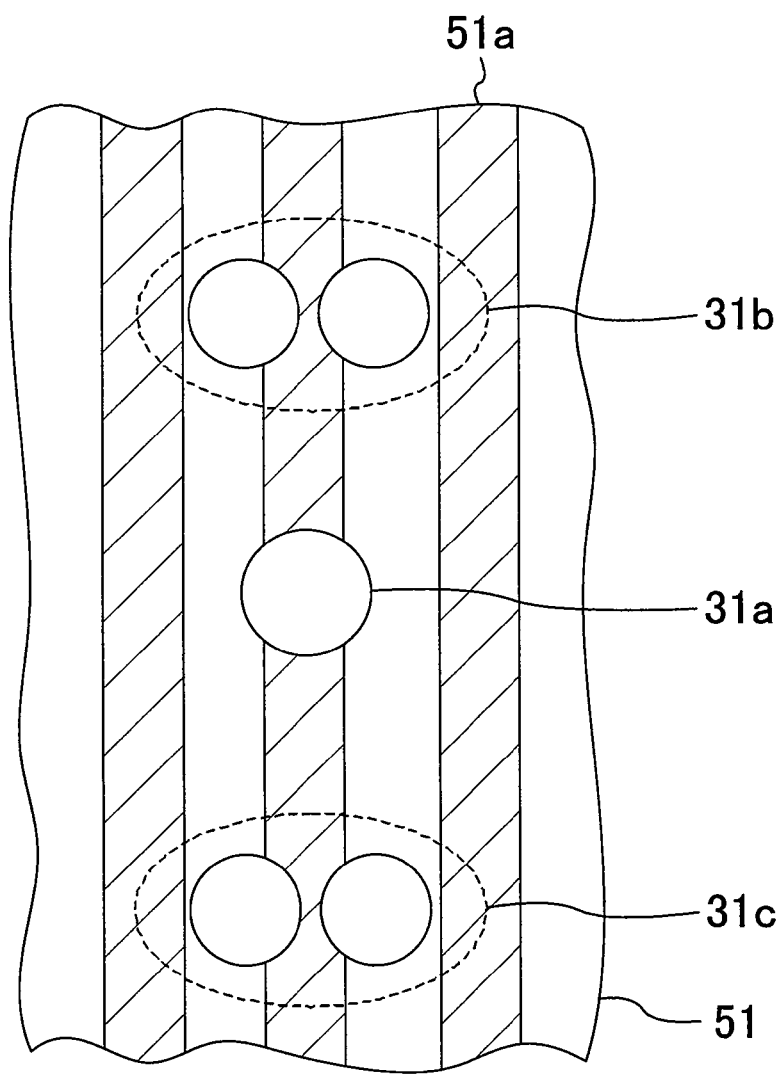
FIG. 4 is a plan view showing the shapes of convergence spots formed on a recording surface of an optical information recording medium by the optical pickup device according to the first embodiment of the invention.

FIG. 4 shows the shapes of respective convergence spots of the main beam 31a and the two sub-beams 31b and 31c of the emitted light beam generated by the diffraction grating 12 on the recording surface of the optical information recording medium 51. In FIG. 4, X direction shows the radius direction of the optical information recording medium and Y direction shows the extending direction of the guide grooves.

In the second region 12B of the diffraction grating 12, the diffraction grating in the first sub-block 13 has a phase difference of 180 degrees from the diffraction grating in the second sub-block 14. Therefore, diffracted light that has passed through the first sub-block 13 and diffracted light that has passed through the second sub-block 14 cancel each other, and the respective convergence spots of the sub-beams 31b and 31c on the recording surface of the optical information recording medium 51 in FIG. 4 have lower intensity in their centers. In this case, it is only necessary that the respective convergence spots of the sub-beams 31b and 31c have lower intensity in their centers, and the phase difference between the first sub-block 13 and the second sub-block 14 may include an error of about ±10 degrees from 180 degrees.

The phase of the diffraction grating in the first region 12A is ahead of that in the first sub-block 13 in the second region 12B by 90 degrees and is behind that in the second sub-block 14 in the second region 12B by 90 degrees. The phase of the diffraction grating in the third region 12C is ahead of that in the second sub-block 14 by 90 degrees and is behind that in the first sub-block 13 by 90 degrees. Accordingly, the phase of the +1$^{st}$ order diffracted beam that has passed through the first region 12A is advanced by 90 degrees from that of the +1$^{st}$ order diffracted beam that has passed through the first sub-block 13, and is retarded by 90 degrees from that of the +1$^{st}$ order diffracted beam that has passed through the second sub-block 14. On the other hand, the phase of the +1$^{st}$ order diffracted beam that has passed through the third region 12C is advanced by 90 degrees from that of the +1$^{st}$ order diffracted beam that has passed through the second sub-block 14, and is retarded by 90 degrees from that of the +1$^{st}$ order diffracted beam that has passed through the first sub-block 13. An opposite phenomenon occurs for the −1$^{st}$ order diffracted beam. Since light whose phase is advanced by 90 degrees and light whose phase is retarded by 90 degrees are equally present on the left and right sides of the convergence spot with respect to Y direction, the intensity distribution of the convergence spot becomes left-right symmetric with respect to Y direction. In this case as well, the phase difference between the first region 12A and the second region 12B and the phase difference between the second region 12B and the third region 12C may include an error of about ±10 degrees from 90 degrees.

As shown in FIG. 4, a plurality of guide grooves 51a are periodically formed on the recording surface of the optical information recording medium 51. The respective convergence spots of the main beam 31a, the sub-beam 31b, and the sub-beam 31c of the emitted light beam converged by the objective lens 19 are located on the same guide groove 51a, as shown in FIG. 4.

The main beam 31a, the sub beam 31b, and the sub beam 31c are reflected at the respective convergence spots, and reflected light beams corresponding to the respective convergence spots are respectively received by the light receiving elements 21A, 21B, and 21C provided in the photodetector 16. The light receiving elements 21A, 21B, and 21C output a push-pull signal MPP corresponding to the main beam 31a, a push-pull signal SPP1 corresponding to the sub-beam 31b, and a push-pull signal SPP2 corresponding to the sub-beam 31c, respectively.

Offset components of the push-pull signals MPP, SPP1, and SPP2 resulting from a radial shift (a shift in the radius direction of the optical information recording medium) of the objective lens 19 and a tilt of the optical information recording medium 51 are generated on the same side (the same phase) for the radial shift of the objective lens 19 or the tilt of the optical information recording medium 51. Accordingly, a differential push-pull (DPP) signal obtained by cancelling the offsets resulting from the radial shift of the objective lens 19 and the tilt of the optical information recording medium 51 can be detected by performing an arithmetic operation shown by the following formula (1) by using the adder 27, the amplifier 28, and the subtracter 29 shown in FIG. 2:

$$DPP=MPP-k\times(SPP1+SPP2) \quad (1)$$

where k is an amplification factor of the amplifier 28.

Figure 5:
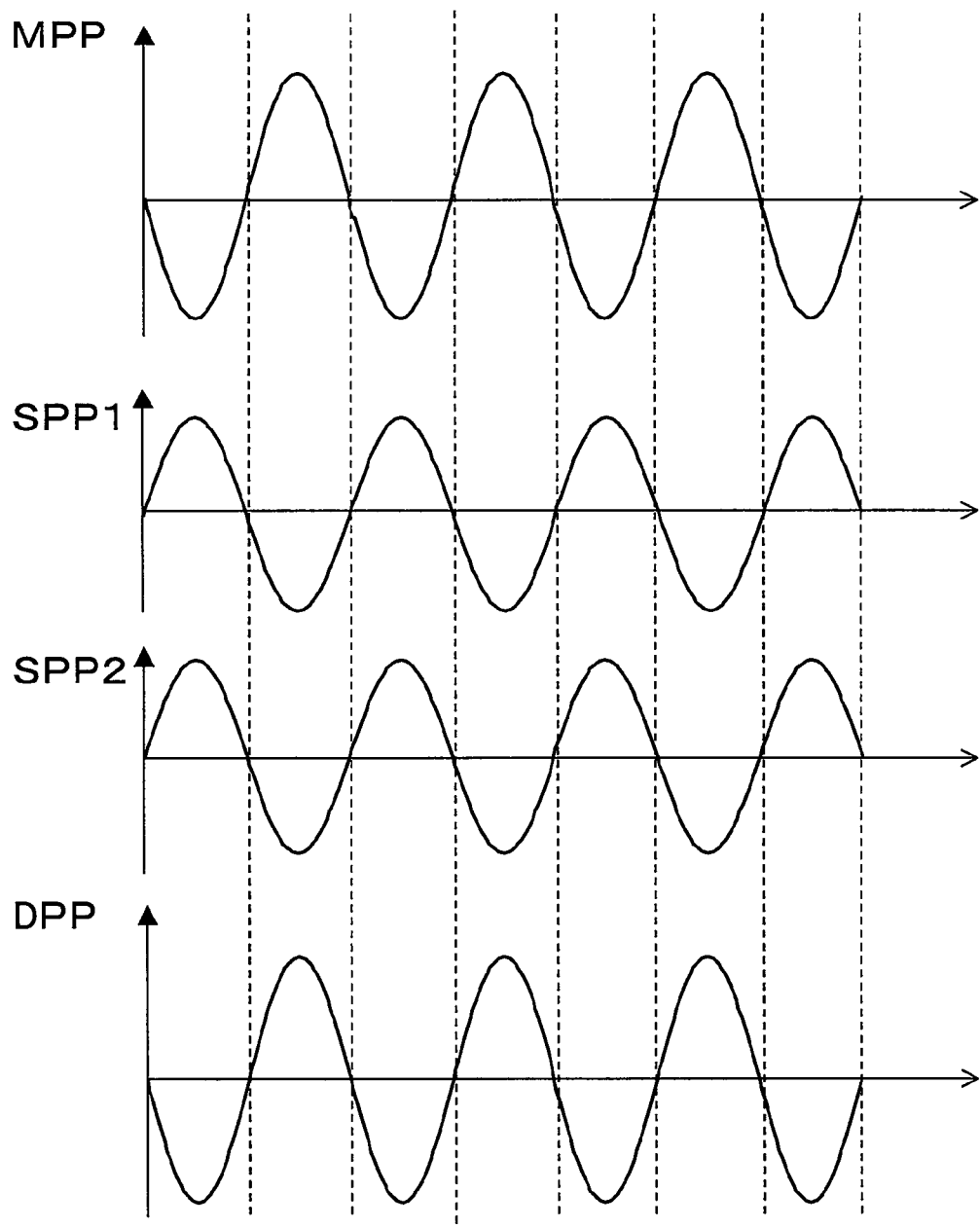
FIG. 5 is a waveform diagram of signals obtained by the optical pickup device according to the first embodiment of the invention.

FIG. 5 shows respective output waveforms of the push-pull signals MPP, SPP1, and SPP2 and the DPP signal obtained by the above formula (1). In FIG. 5, the ordinate indicates signal strength and the abscissa indicates a relative position of the convergence spot on the optical information recording medium 51. As shown in FIG. 5, SPP1 and SPP2 have a phase difference of exactly 180 degrees from MPP. Since the DPP signal obtained by the above formula (1) has a proper value, each convergence spot can be formed on the same guide groove.

As shown in FIG. 2, the inputs of the adder 27 are respectively connected to the respective outputs of the subtracters 25 and 26, and the input of the amplifier 28 is connected to the output of the adder 27. The inputs of the subtracter 29 are respectively connected to the output of the subtracter 24 and the output of the amplifier 28. The arithmetic operation shown by the above formula (1) can be performed with this structure. The coefficient k in the formula (1) is used to correct the difference in light intensity among the main beam 31a, the sub-beam 31b, and the sub-beam 31c that are reflected from the optical information recording medium 51. When the light intensity ratio of the main beam 31a, the sub-beam 31c, and the sub-beam 31c is a:b:b, the coefficient k is a/2b. In other words, the coefficient k is a constant that is determined according to the optical information recording medium 51. A conventional structure may be used as a signal processing circuit.

Figure 6:
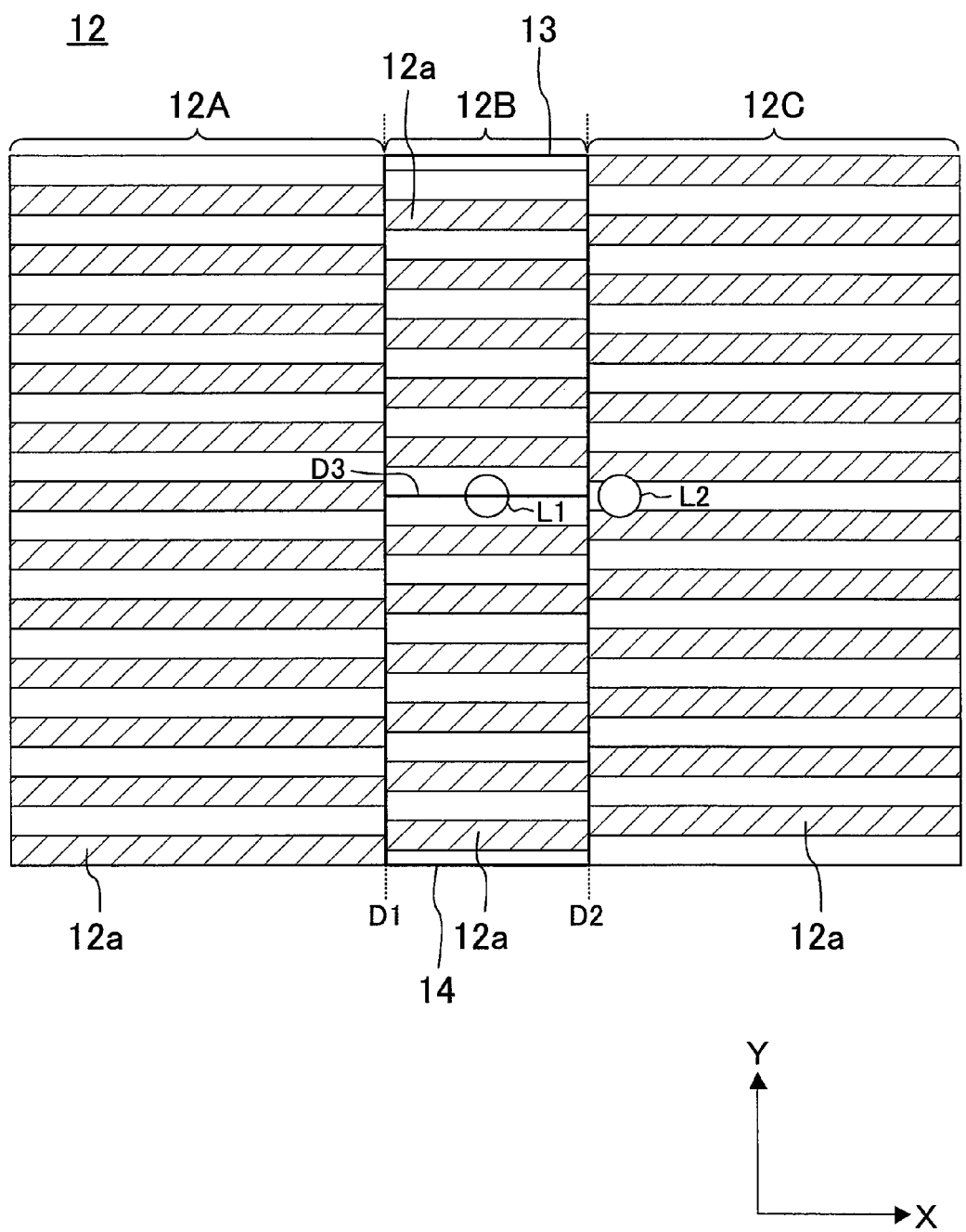
FIG. 6 is a plan view showing an example of a positional relation between the diffraction grating of the optical pickup device according to the first embodiment of the invention and the respective centers of light beams.

The structure shown in this embodiment has one light source. However, there may be a plurality of light sources. In this case, it is preferable that the center of a light beam emitted from at least one of the plurality of light sources is positioned on the dividing line D3 in the second region 12B as shown in FIG. 6.

Figure 7:
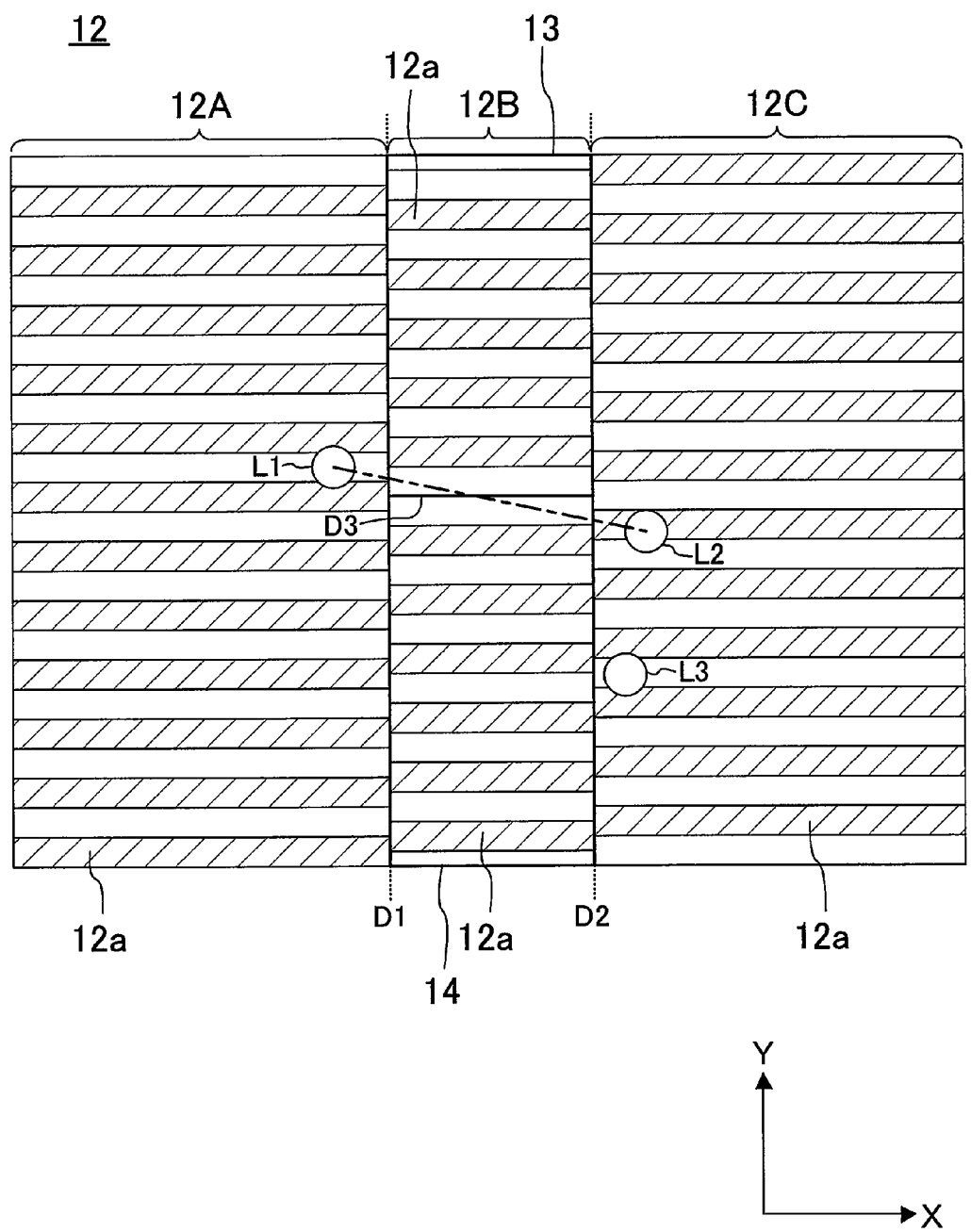
FIG. 7 is a plan view showing an example of a positional relation between the diffraction grating of the optical pickup device according to the first embodiment of the invention and the respective centers of light beams.

As shown in FIG. 7, the center of a light beam L1 emitted from a first light source of the plurality of light sources and the center of a light beam L2 emitted from a second light source may be positioned so that a straight line connecting the center of the light beam L1 and the center of the light beam L2 crosses the dividing line D3 in the second region 12B. In this case, the position of the center L3 of a light beam emitted from a third light source is not particularly limited. The third light source need not necessarily be provided.

Second Embodiment

Figure 8:
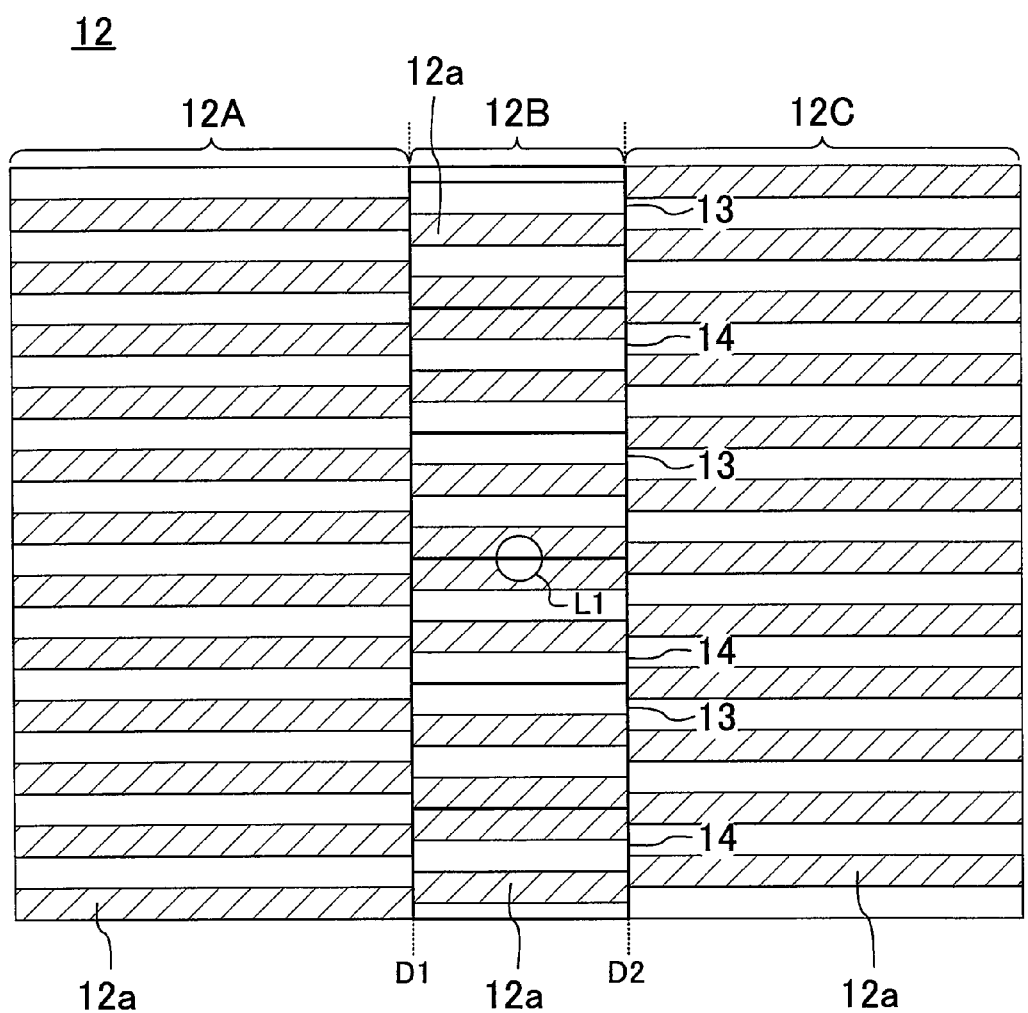
FIG. 8 is a plan view of a diffraction grating of an optical pickup device according to a second embodiment of the invention.

Hereinafter, a second embodiment of the invention will be described with reference to the figures. FIG. 8 shows a diffraction grating 12 used in an optical pickup device of the second embodiment. In FIG. 8, the same elements as those in FIG. 3 are denoted by the same reference numerals and characters and description thereof will be omitted. As shown in FIG. 8, in the diffraction grating 12 of this embodiment, the first sub-block 13 and the second sub-block 14 are alternately arranged in the second region 12B.

With this structure, the difference between the total area of the emitted light beam 31 passing through the first sub-blocks 13 and the total area of the emitted light beam 31 passing through the second sub-blocks 14, that is, the difference between the total light quantity of the emitted light beam 31 passing through the first sub-blocks 13 and the total light quantity of the emitted light beam 31 passing through the second sub-blocks 14, can be suppressed. Accordingly, excellent properties can be obtained regardless of the position of the diffraction grating 12 in Y direction, that is, the position of the center of the light beam emitted from the light source 11.

Note that, in the example shown herein, the first sub-block 13 and the second sub-block 14 are repeated three times. However, the number of repetitions is not limited. The order of repetition may be reversed.

In FIG. 8, the first sub-block 13 and the second sub-block 14 have the same length in Y direction. However, the first sub-block 13 and the second sub-block 14 may have different lengths in Y direction. It is preferable that the sum of the lengths of the first sub-blocks 13 in Y direction is equal to the sum of the lengths of the second sub-blocks 14 in Y direction.

FIG. 8 shows an example in which the center L1 of the light beam 31 emitted from the light source 11 is positioned on a dividing line that separates the first sub-block 13 and the second sub-block 14 from each other. However, the invention is not limited to this, and the center of the light beam 31 emitted from the light source 11 need only be positioned in the second region 12B.

Figure 9:
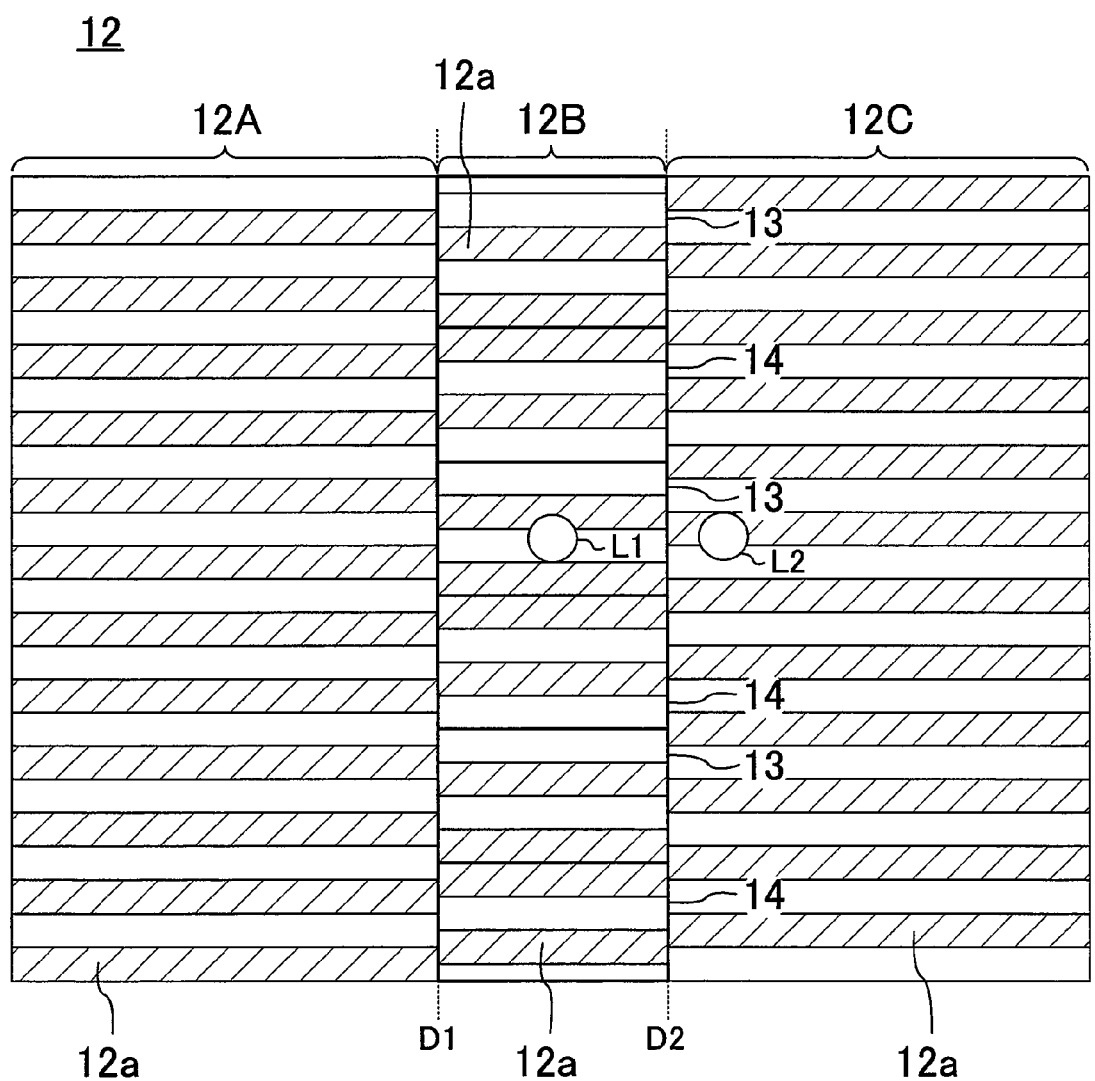
FIG. 9 is a plan view showing an example of a positional relation between the diffraction grating of the optical pickup device according to the second embodiment of the invention and the respective centers of light beams.

There is one light source in the second embodiment. However, there may be a plurality of light sources. In this case, as shown in FIG. 9, it is preferable that the center of a light beam emitted from at least one of the plurality of light sources is positioned in the second region 12B.

Figure 10:
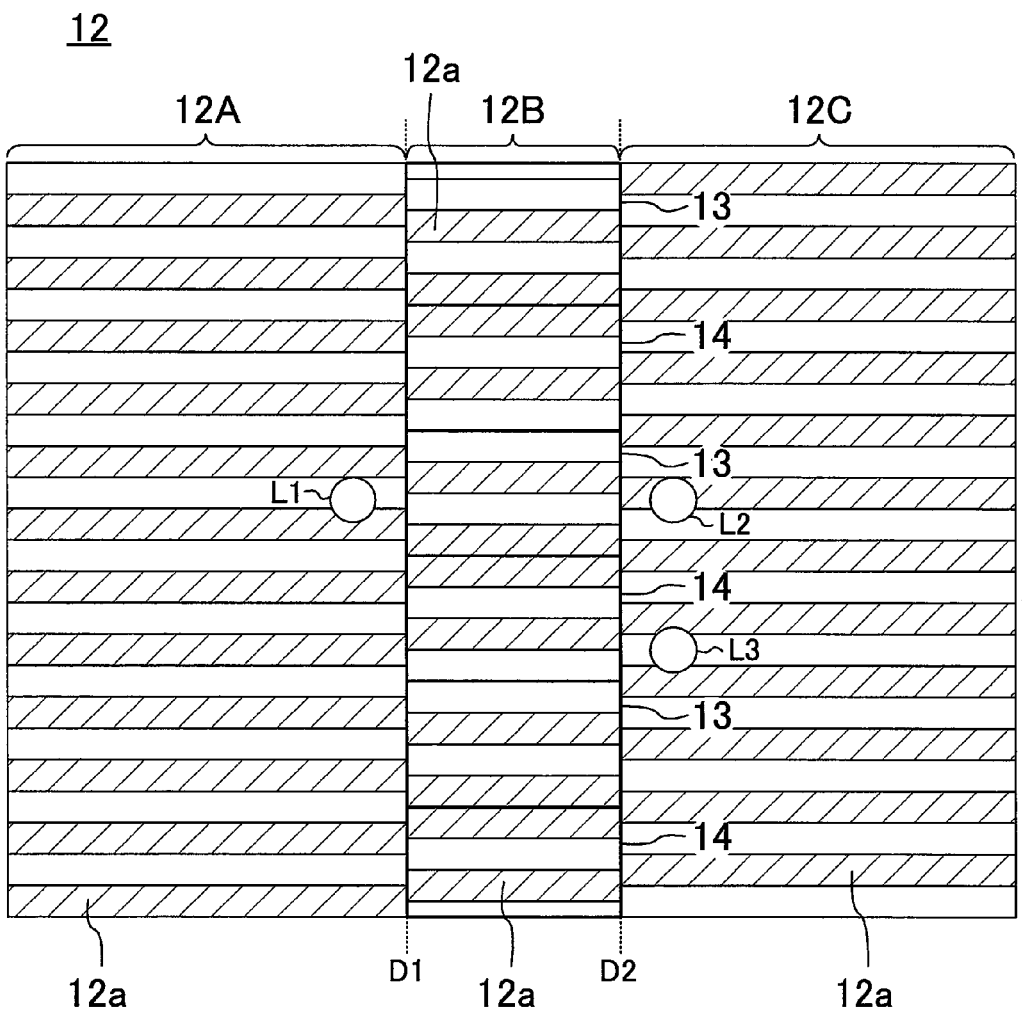
FIG. 10 is a plan view showing an example of a positional relation between the diffraction grating of the optical pickup device according to the second embodiment of the invention and the respective centers of light beams.
Figure 11:
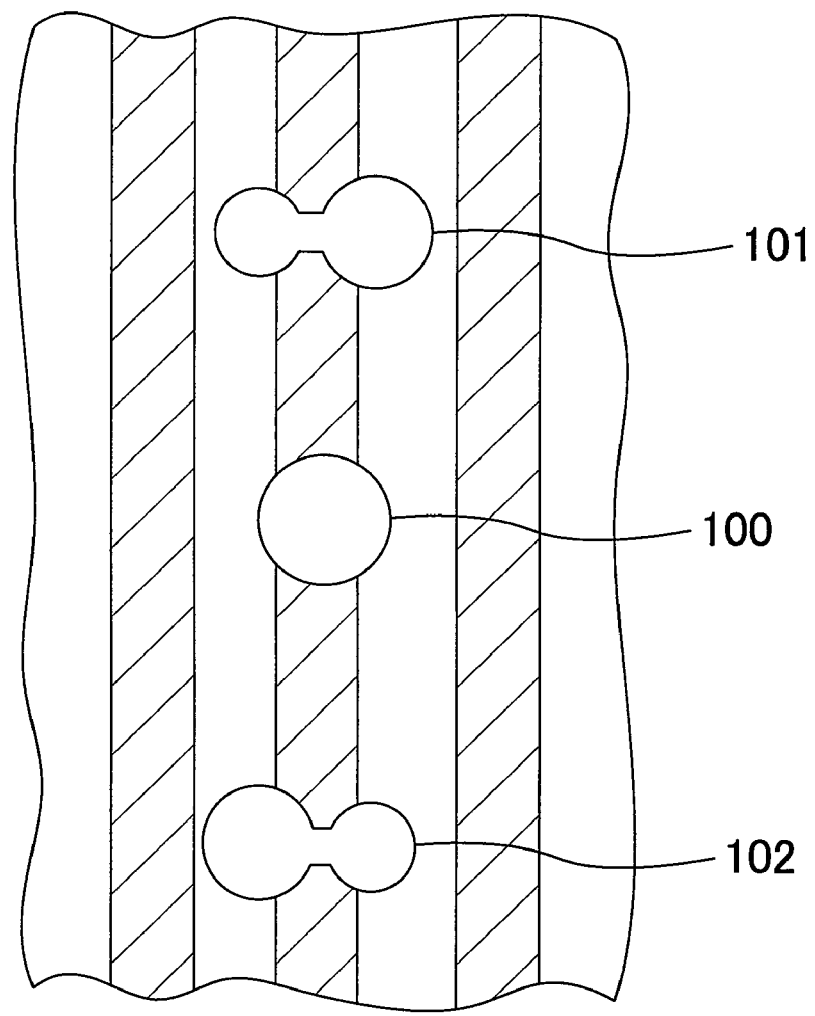
FIG. 11 is a plan view showing the shapes of convergence spots formed on a recording surface of an optical information recording medium by a conventional optical pickup device.
Figure 11:
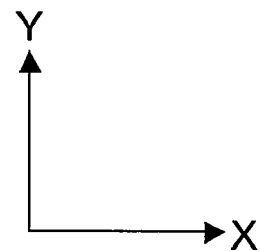
Figure 12:
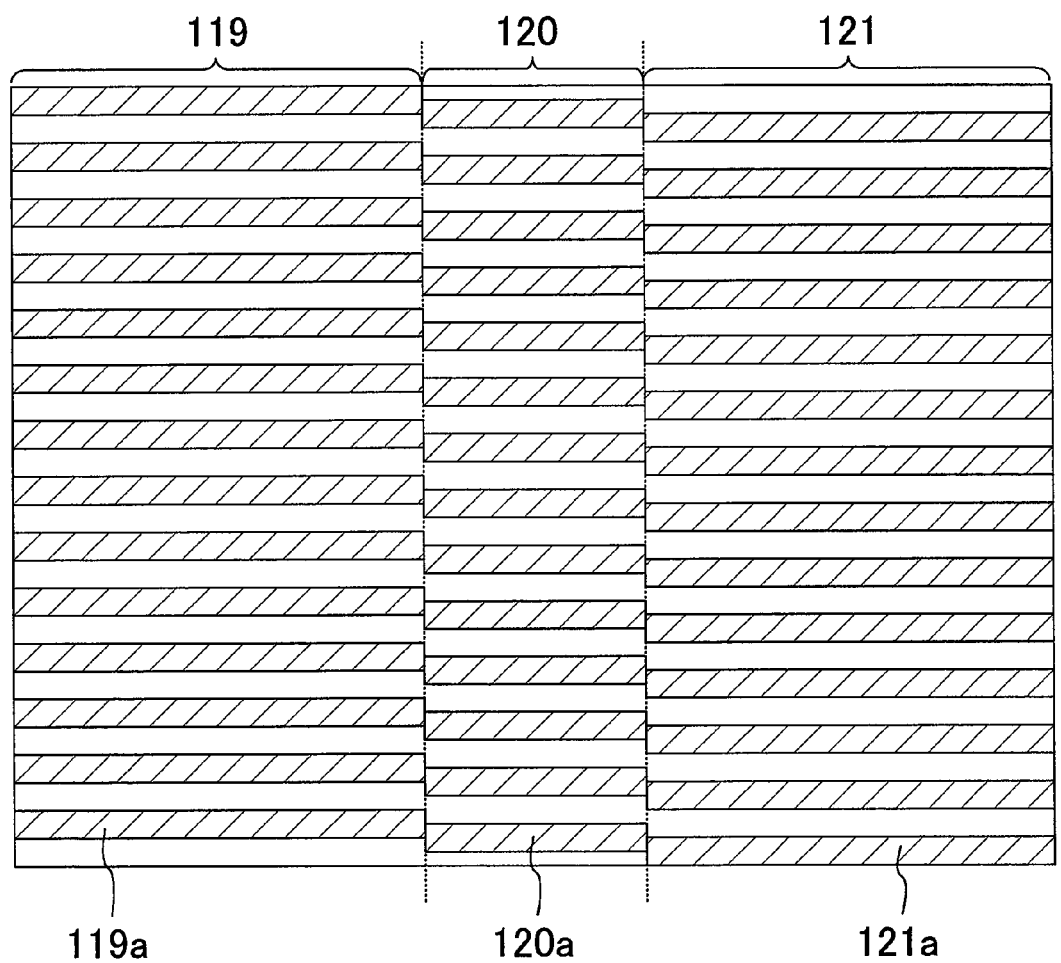
FIG. 12 is a plan view of a diffraction grating of the conventional optical pickup device.

As shown in FIG. 10, the center L1 of a light beam emitted from a first light source of the plurality of light sources may be positioned in the first region 12A and the center L2 of a light beam emitted from a second light source may be positioned in the third region 12C. In this case, the position of the center L3 of a light beam emitted from a third light source is not particularly limited. The third light source need not necessarily be provided.

In the first and second embodiments, the type of the optical information recording medium 51 is not particularly limited, and DVDs including a DVD-ROM, a DVD-RAM, a DVD-R, and a DVD-RW and CDs including a CD-ROM, a CD-R, and a CD-RW may be used as the optical information recording medium 51. The wavelength of the emitted light beam 31 is determined according to the optical information recording medium 51, and is in the range of about 650 nm to about 780 nm in the case of a DVD and a CD. For DVDs, stable tracking error signal detection can be performed on a DVD having a guide groove pitch of 0.74 μm such as a DVD-R and a DVD having a guide groove pitch of 1.23 μm such as a DVD-RAM.

In each of the above embodiments, the diffraction grating 12 is placed between the light source 11 and the half mirror 15 in the optical system shown in FIG. 1. However, the diffraction grating 12 may alternatively be placed, for example, between the half mirror 15 and the collimating lens 18. Instead of the optical system of FIG. 1, an optical system in which a light source and a photodetector are integrated (for example, an optical system that does not use a half mirror) may be used and the diffraction grating may be placed between the light source and the collimating lens.

In each of the above embodiments, the grating grooves in each region of the diffraction grating 12 are formed along X direction, that is, the radius direction of the optical information recording medium. However, the grating grooves may alternatively be formed in a direction oblique to X direction.

As has been described above, the optical pickup device of each embodiment can be used for various optical information recording media having different guide groove pitches and achieves tracking error signal detection that enables more stable recording and playback. In other words, the optical pickup device of each embodiment can implement size reduction, simplification, cost reduction, higher efficiency, and the like in DVD- and CD-type recording devices and playback devices. Moreover, the optical pickup device of each embodiment is very useful as an optical pickup device having a function to detect signals such as a playback signal, a recording signal, and various servo signals which are used in an optical head device serving as a main part of an optical information processor for performing processing, such as recording, playback, and erasure of information, on an optical information recording medium such as an optical disc.

INDUSTRIAL APPLICABILITY

The invention can implement an optical pickup device for performing stable tracking error detection on a plurality of optical information recording media having different guide groove pitches while maintaining the advantages of the in-line DPP method. The optical pickup device of the invention is useful as devices such as an optical pickup device that is used in an optical information processor for performing processing such as recording of information onto an optical information recording medium and playback or erasure of information recorded on an optical information recording medium.

What is claimed is:

1. An optical pickup device for recording information onto an optical information recording medium and reading and erasing information recorded on the optical information recording medium, comprising:
   a light source;
   a diffraction grating for separating a light beam emitted from the light source into at least three light beams; and
   a photodetector for receiving the separated light beams reflected from the optical information recording medium, wherein
   the diffraction grating is divided into a first region, a second region, and a third region having periodic structures with different phases by a dividing line of a first direction that is a straight line extending in a direction parallel to a tangential direction of a track of the optical information recording medium,
   the second region is located between the first region and the third region and is divided into a first sub-block and a second sub-block having the periodic structures with different phases by a dividing line of a second direction that is a straight line extending in a direction parallel to a radius direction of the optical information recording medium,
   the periodic structure of the first sub-block has a phase difference of approximately 180 degrees from the periodic structure of the second sub-block,
   the periodic structure of the first region has a phase difference of approximately 90 degrees from the periodic structure of the first sub-block, and
   the periodic structure of the first region has a phase difference of approximately 180 degrees from the periodic structure of the third region.

2. The optical pickup device according to claim 1, wherein a center of the light beam emitted from the light source is positioned on the dividing line of the second direction in the second region of the diffraction grating.

3. The optical pickup device according to claim 1, wherein the light source includes a plurality of light sources, and a center of a light beam emitted from at least one of the plurality of light sources is positioned on the dividing line of the second direction in the second region of the diffraction grating.

4. The optical pickup device according to claim 1, wherein the light source includes a first light source and a second light source,
   a center of a light beam emitted from the first light source is positioned in the first region of the diffraction grating or on the dividing line of the first direction that separates the first region and the second region from each other,
   a center of a light beam emitted from the second light source is positioned in the third region of the diffraction grating or on the dividing line of the first direction that separates the second region and the third region from each other, and
   a straight line connecting the center of the light beam emitted from the first light source and the center of the light beam emitted from the second light beam crosses the dividing line of the second direction.

5. The optical pickup device according to claim 1, wherein a length of the first sub-block in the tangential direction is equal to a length of the second sub-block in the tangential direction.

6. The optical pickup device according to claim 1, wherein the at least three light beams include a $0^{th}$ order diffracted beam, a $+1^{st}$ order diffracted beam, and a $-1^{st}$ order diffracted beam.

7. The optical pickup device according to claim 1, wherein a plurality of guide grooves are periodically formed on a recording surface of the optical information recording medium, and each of the separated light beams is converged on one of the plurality of guide grooves.

8. The optical pickup device according to claim 1, further comprising an arithmetic processing circuit for detecting a tracking error signal by a differential push-pull method based on an output signal of the photodetector.

9. The optical pickup device according to claim 1, wherein the photodetector includes at least three light receiving elements respectively corresponding to the reflected light beams, and each of the light receiving elements is divided into a plurality of light receiving regions.

10. An optical pickup device for recording information onto an optical information recording medium and reading and erasing information recorded on the optical information recording medium, comprising:
    a light source;
    a diffraction grating for separating a light beam emitted from the light source into at least three light beams; and
    a photodetector for receiving the separated light beams reflected from the optical information recording medium, wherein
    the diffraction grating is divided into a first region, a second region, and a third region having periodic structures with different phases by a dividing line of a first direction that is a straight line extending in a direction parallel to a tangential direction of a track of the optical information recording medium,
    the second region is located between the first region and the third region and is divided into a first sub-block and a second sub-block having the periodic structures with different phases by a dividing line of a second direction that is a straight line extending in a direction parallel to a radius direction of the optical information recording medium, and the first sub-block and the second sub-block are alternately arranged in the second region in a direction parallel to the tangential direction of the track of the optical information recording medium,
    the periodic structure of the first sub-block has a phase difference of approximately 180 degrees from the periodic structure of the second sub-block,
    the periodic structure of the first region has a phase difference of approximately 90 degrees from the periodic structure of the first sub-block, and
    the periodic structure of the first region has a phase difference of approximately 180 degrees from the periodic structure of the third region.

11. The optical pickup device according to claim 10, wherein a center of the light beam emitted from the light source is positioned in the second region of the diffraction grating.

12. The optical pickup device according to claim 10, wherein the light source includes a plurality of light sources, and a center of a light beam emitted from at least one of the plurality of light sources is positioned in the second region of the diffraction grating.

13. The optical pickup device according to claim 10, wherein the light source includes a first light source and a second light source, a center of a light beam emitted from the first light source is positioned in the first region of the diffraction grating or on the dividing line of the first direction that separates the first region and the second region from each other, and a center of a light beam emitted from the second light source is positioned in the third region of the diffraction grating or on the dividing line of the first direction that separates the second region and the third region from each other.

14. The optical pickup device according to claim 10, wherein the at least three light beams include a $0^{th}$ order diffracted beam, a $+1^{st}$ order diffracted beam, and a $-1^{st}$ order diffracted beam.

15. The optical pickup device according to claim 10, wherein a plurality of guide grooves are periodically formed on a recording surface of the optical information recording medium, and each of the separated light beams is converged on one of the plurality of guide grooves.

16. The optical pickup device according to claim 10, further comprising an arithmetic processing circuit for detecting a tracking error signal by a differential push-pull method based on an output signal of the photodetector.

17. The optical pickup device according to claim 10, wherein the photodetector includes at least three light receiving elements respectively corresponding to the reflected light beams, and each of the light receiving elements is divided into a plurality of light receiving regions.

* * * * *